United States Patent
Edling et al.

(10) Patent No.: US 8,493,823 B1
(45) Date of Patent: Jul. 23, 2013

(54) VARIABLE DATA TRANSFER RATE OPTICAL TAPE DRIVE SYSTEM AND METHOD

(71) Applicant: Oracle International Corporation, Redwood City, CA (US)

(72) Inventors: Dwayne Edling, Mead, CO (US); Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/665,179

(22) Filed: Oct. 31, 2012

(51) Int. Cl.
G11B 27/10 (2006.01)
G11B 15/14 (2006.01)
G11B 15/467 (2006.01)
G11B 7/003 (2006.01)

(52) U.S. Cl.
USPC .................. 369/44.18; 386/221; 720/746

(58) Field of Classification Search
None
See application file for complete search history.

(56) References Cited

U.S. PATENT DOCUMENTS

| | | | |
|---|---|---|---|
| 4,815,067 A * | 3/1989 | Webster et al. | 369/97 |
| 4,939,715 A * | 7/1990 | Vogelgesang et al. | 360/93 |
| 5,524,105 A * | 6/1996 | Brewen et al. | 369/97 |
| 6,690,636 B1 * | 2/2004 | Marchant | 369/97 |
| 6,768,608 B2 * | 7/2004 | Saliba et al. | 360/77.03 |
| 7,633,701 B2 * | 12/2009 | Gill et al. | 360/72.1 |
| 7,969,832 B2 * | 6/2011 | Raniuk et al. | 369/44.28 |
| 8,014,239 B2 * | 9/2011 | Coles et al. | 369/44.18 |
| 8,174,950 B2 * | 5/2012 | Ritter et al. | 369/97 |
| 2003/0043495 A1 * | 3/2003 | Mayer | 360/75 |
| 2006/0164744 A1 * | 7/2006 | Greco et al. | 360/55 |
| 2007/0091499 A1 * | 4/2007 | Saliba | 360/71 |
| 2010/0074090 A1 * | 3/2010 | Lee | 369/103 |
| 2010/0135129 A1 * | 6/2010 | Mahnad | 369/44.11 |
| 2011/0267717 A1 * | 11/2011 | Cherubini et al. | 360/77.12 |
| 2012/0218658 A1 * | 8/2012 | Fry et al. | 360/53 |

* cited by examiner

Primary Examiner — Peter Vincent Agustin
(74) Attorney, Agent, or Firm — Brooks Kushman P.C.

(57) ABSTRACT

An optical tape drive system includes n total optical pickup units and a controller. The controller writes readable data in logical wraps each having less than n physical tracks to the optical tape via at least some of the optical pickup units such that for each of the logical wraps that contain readable data, all physical tracks within the logical wrap contain readable data.

18 Claims, 4 Drawing Sheets

VARIABLE DATA TRANSFER RATE OPTICAL TAPE DRIVE SYSTEM AND METHOD

TECHNICAL FIELD

This disclosure relates to optical tape drive systems.

BACKGROUND

Optical tape is a data storage medium. In certain examples, it can take the form of long narrow strips onto which patterns can be written and from which patterns can be read. Optical tape may facilitate higher data transfer rates, greater storage capacity, and reduced access times relative to magnetic tape. Moreover because optical tape is written and read using optical pick up units that do not touch the recording surface of the tape, it may be more durable than magnetic tape.

SUMMARY

An optical tape drive system includes n total optical pickup units and a controller. Each of the optical pickup units has a same fixed unit data rate and is calibrated to operate at a particular optical tape speed. The controller writes, at the particular optical tape speed, readable data in logical wraps to the optical tape via at least some of the optical pickup units at a selected one of several available system data rates such that for each of the logical wraps that contain readable data, all physical tracks within the logical wrap contain readable data. Each of the available system data rates is less than the product of n and the fixed unit data rate. The controller may render inactive a number of the optical pickup units equal to the complement of the quotient of the selected system data rate and fixed unit data rate to achieve the selected system data rate. The controller may render inactive adjacent optical pickup units. The controller may render inactive adjacent optical pickup units such that all active optical pickup units are adjacent to one another. The number of physical tracks within each of the logical wraps may be equal to the number of active optical pickup units. The controller may render inactive a different number of the optical pickup units to achieve each of the available system data rates.

An optical tape drive system includes n total optical pickup units and a controller. The controller writes readable data in logical wraps to the optical tape via at least some of the optical pickup units such that for each of the logical wraps that contain readable data, all physical tracks within the logical wrap contain readable data, and each of the logical wraps has less than n physical tracks. Each of the optical pickup units may have a same fixed unit data rate and the controller may write readable data at a selected system data rate less than the product of n and the fixed unit data rate. The number of physical tracks within each of the logical wraps may be based on the selected system data rate. The number of physical tracks within each of the logical wraps may be based on the fixed unit data rate. The controller may render inactive a number of the optical pickup units equal to the complement of the quotient of the selected system data rate and fixed unit data rate to achieve the selected system data rate. The controller may render inactive adjacent optical pickup units. The controller may render inactive adjacent optical pickup units such that all active optical pickup units are adjacent to one another. The number of physical tracks within each of the logical wraps may be equal to the number of active optical pickup units.

Data is written to optical tape with an optical tape drive system having n total optical pickup units each having a same fixed unit data rate by receiving a selected system data rate less than the product of n and the fixed unit data rate, rendering inactive a number of the optical pickup units based on the selected system data rate and the fixed unit data rate, and writing readable data at the selected system data rate in logical wraps to the optical tape via the optical pickup units that are active such that the number of physical tracks within each of the logical wraps is equal to the number of optical pickup units that are active. The number of the optical pickup units may be rendered inactive such that the optical pickup units that are active are adjacent to one another. For each of the logical wraps that contain readable data, all physical tracks within the logical wrap may contain readable data. The number of the optical pickup units that are active may be equal to the quotient of the selected system data rate and the fixed unit data rate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
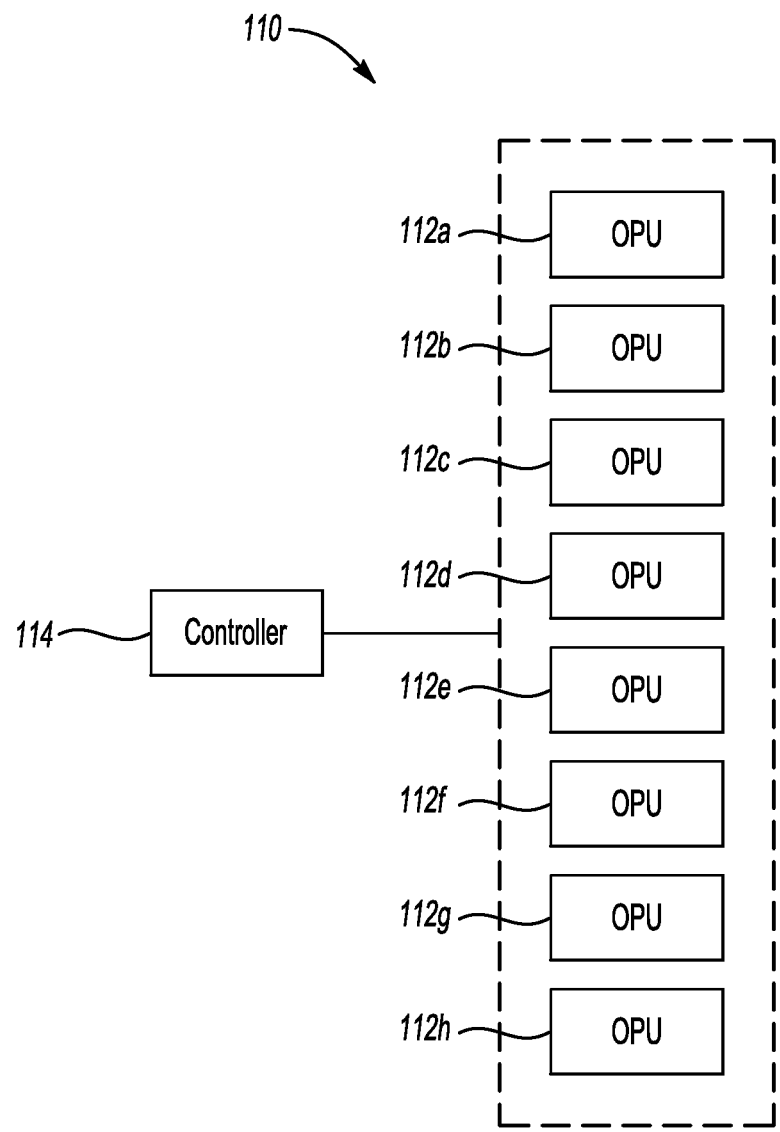
FIG. 1 is a schematic diagram of portions of an optical tape system.

With reference to FIG. 1, an optical tape drive system 110 may include, inter alia, a plurality of optical pickup units 112n (e.g., 112a-112h) and a controller 114 as known in the art. Each of the optical pickup units 112n may generate an optical beam that when focused on a physical track of optical tape, writes data to or reads data from the physical track under the control of the controller 114. In the example of FIG. 1, the optical tape drive system 110 includes 8 optical pickup units 112n. The number of optical pickup units in other examples may of course be different. An alternative optical tape drive system, for example, may only include 6 optical pickup units, etc.

An optical pickup unit is typically tuned to operate at a particular optical tape speed. That is, laser diodes of the optical pickup unit are calibrated according to the expected tape speed. Hence unlike magnetic tape drive systems, system data transfer rates cannot be changed by simply altering the tape speed. Such action would result in the laser diodes being mis-calibrated for the tape speed, and unreadable data to be written or written data to be unreadable. Changes to the tape speed thus require time consuming recalibration of the laser diodes, which may be undesirable.

As mentioned above, optical tape drive system maximum data transfer rates may be relatively high. If, for example, each of the optical pickup units $112n$ has a data rate of 30 megabits per second (MB/s), the maximum data transfer rate for the optical tape drive system 110 would be 240 MB/s. Certain optical tape applications such as backup and archive solutions, however, cannot maintain such a high sustained throughput speed. Also, the number of tape stops and tape starts associated with data underruns (write) and data overruns (read) may increase as the difference between application throughput speed and system data transfer rate increases. Hence, reducing system data transfer rate without adjusting tape speed (so as to avoid time consuming recalibration of laser diodes) to match application throughput speed may improve overall system performance.

Figure 2:
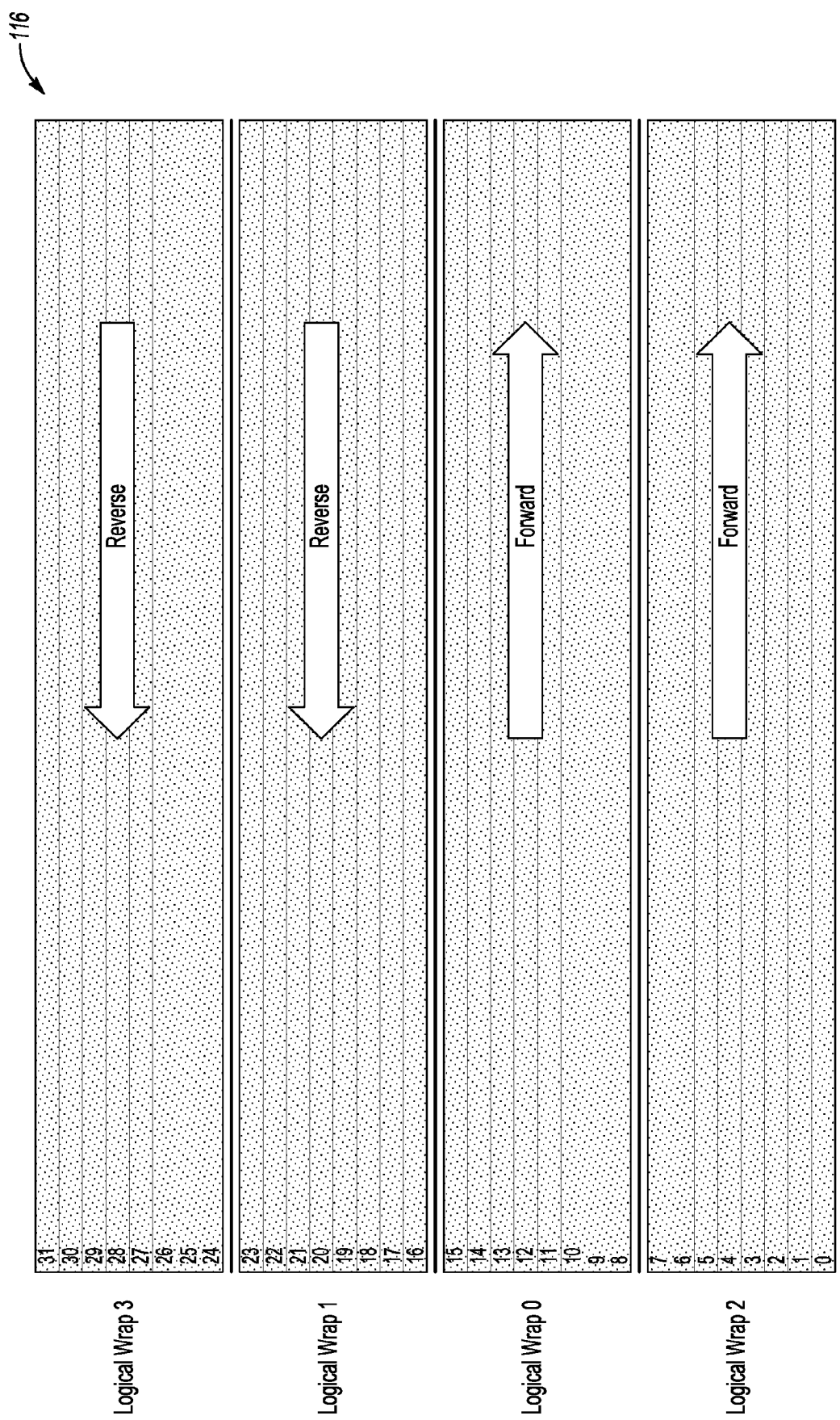
FIGS. 2 and 3 are schematic diagrams of optical tape each written with 4 wraps, each wrap having 8 physical tracks.

Referring to FIGS. 1 and 2, an optical tape 116 may include 32 physical tracks (track 0-track 31). All of the tracks in this example are to be written in 4 wraps, each wrap having 8 physical tracks. That is in this example, the number of physical tracks in each wrap is defined by the total number of optical pickup units $112n$ of the optical tape drive system 110. To write logical wrap 0, the controller 114 positions, at beginning of tape, the optical pickup unit $112a$ over track 15, optical pickup unit $112b$ over track 14, optical pickup unit $112c$ over track 13, . . . , and optical pickup unit $112h$ over track 8. The tape 116 is then moved in the forward direction to write data to tracks 8 through 15 via the optical pickup units $112n$ until end of tape is reached. To write logical wrap 1, the controller 114 positions, at the end of tape, the optical pickup unit $112a$ over track 23, optical pickup unit $112b$ over track 22, optical pickup unit $112c$ over track 21, . . . , and optical pickup unit $112h$ over track 16. The tape 116 is then moved in the reverse direction to write data to tracks 16 through 23 via the optical pickup units $112n$ until the beginning of tape is reached. To write logical wrap 2, the controller 114 positions, at the beginning of tape, the optical pickup unit $112a$ over track 7, optical pickup unit $112b$ over track 6, optical pickup unit $112c$ over track 5, . . . , and optical pickup unit $112h$ over track 0. The tape 16 is then moved in the forward direction to write data to tracks 0 through 7 via the optical pickup units $112n$ until the end of tape is reached. Finally to write logical wrap 3, the controller 114 positions, at the end of tape, the optical pickup unit $112a$ over track 31, optical pickup unit $112b$ over track 30, optical pickup unit $112c$ over track 29, . . . , and optical pickup unit $112h$ over track 24. The tape 116 is then moved in the reverse direction to write data to tracks 24 through 31 via the optical pickup units $112n$ until the beginning of tape is reached. This example tape format is designed such that at the completion of a full tape write, the tape is positioned at the beginning of tape to facilitate ease of unloading.

Figure 3:
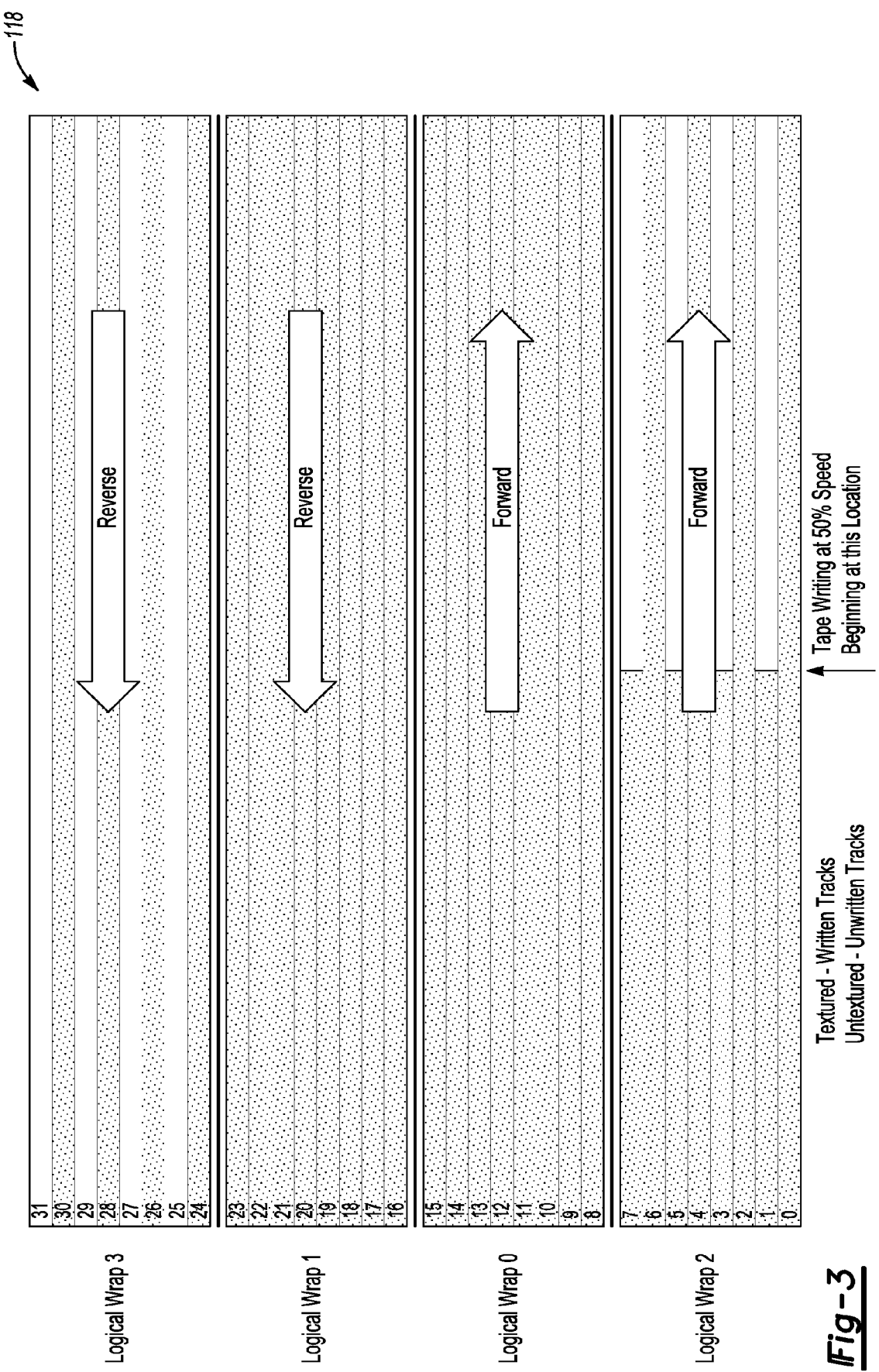

Referring to FIGS. 1 and 3, another optical tape 118 may include 32 tracks (track 0-track 31). All of the tracks in this example are again to be written in 4 wraps, each wrap having 8 physical tracks. In this example, the data throughput will be reduced by 50% while logical wrap 2 is being written. The controller 114 positions the optical pickup units $112n$ over the appropriate physical tracks associated with the particular wrap to be written as described above. The optical pickup units $112a$, $112c$, $112e$, $112g$ associated with tracks 7, 5, 3, 1 respectively, however, are turned off while logical wrap 2 is written. The optical pickup units $112a$, $112c$, $112e$, $112g$ then remain off while logical wrap 3 is written. Assuming that each of the optical pickup units $112n$ has a data rate of 30 MB/s as mentioned above, the data throughput will be 240 MB/s while writing logical wraps 0, 1, and the first half of 2. The data throughput will then be 120 MB/s while writing the second half of logical wrap 2 and logical wrap 3. Additional optical pickup units, in other examples, may be turned off to further reduce the data throughput. Likewise, fewer optical pickup units may be turned off to increase the data throughput.

Portions of tracks 1, 3, 5, 7 and all of tracks 25, 27, 29, 31 lack data. It may be difficult to impossible to design a tape format that would allow these unwritten tracks to be reclaimed without overwriting existing data in other tracks. Hence, the strategy described with reference to FIG. 3 achieves a desired data throughput at the expense of tape capacity: the greater the decrease in data throughput, the greater the increase in lost capacity.

Each of the wraps in the examples of FIGS. 2 and 3 have 8 physical tracks. That is regardless of whether optical pickup units are turned off to achieve a less than maximum data throughput, the number of physical tracks defining a logical wrap is equal to the total number of the optical pickup units associated with the optical tape drive system. If, for example, a given optical tape drive system has n total optical pickup units, logical wraps written by the optical tape drive system employing an algorithm similar to that described with reference to FIGS. 2 and 3 will each have n physical tracks, which leads to lost tape capacity as optical pickup units are turned off to reduce data throughput.

Certain strategies described herein may attempt to address this throughput versus capacity trade-off by defining logical wraps according to the number of active optical pickup units needed to achieve the desired data transfer rate rather than according to the total number of optical pickup units. Optical pickup units may be turned off as mentioned above to achieve data transfer rates in multiples of optical pickup unit data rate. If, for example, optical pickup unit data rate is 20 MB/s and there are 6 total optical pickup units associated with the optical tape drive system, available data transfer rates for the optical tape drive system would be 20 MB/s, 40 MB/s, 60 MB/s, . . . , 120 MB/s. When reducing the optical tape drive system data transfer rate, however, the number of physical tracks within each logical wrap should be equal to the number of active optical pickup units. The active optical pickup units may, but need not, be adjacent to one another because each optical pickup unit has a range of motion that can cover many physical tracks. If, for example, 40 MB/s is the desired system data transfer rate, 4 of the 6 total optical pickup units should be turned off such that a logical wrap having 2 adjacent physical tracks can be written. The 4 inactive optical pickup units may be adjacent to one another and the 2 active optical pickup units may be adjacent to one another. That is, if the optical pickup units are labeled sequentially u, v, w, x, y, z, either u and v or y and z may be active. If, for example, 60 MB/s is the desired system data transfer rate, 3 of the 6 total optical pickup units should be turned off such that a logical wrap having 3 adjacent physical tracks can be written. The 3 inactive optical pickup units may be adjacent to one another and the 3 active optical pickup units may be adjacent to one another. That is, u, v, w or v, w, x, or x, y, z may be active.

Once a drive has been configured to write at a specific tape speed, any cartridge that is written from beginning of tape may use the logical speed format selected for that drive. This format may be detected on tape load so that the data can be read using the cartridge logical format. Once a tape cartridge has been written with a drive tuned to a lower performance level, however, that cartridge may only work at the lower performance level until it is written again from beginning of tape.

Figure 4:
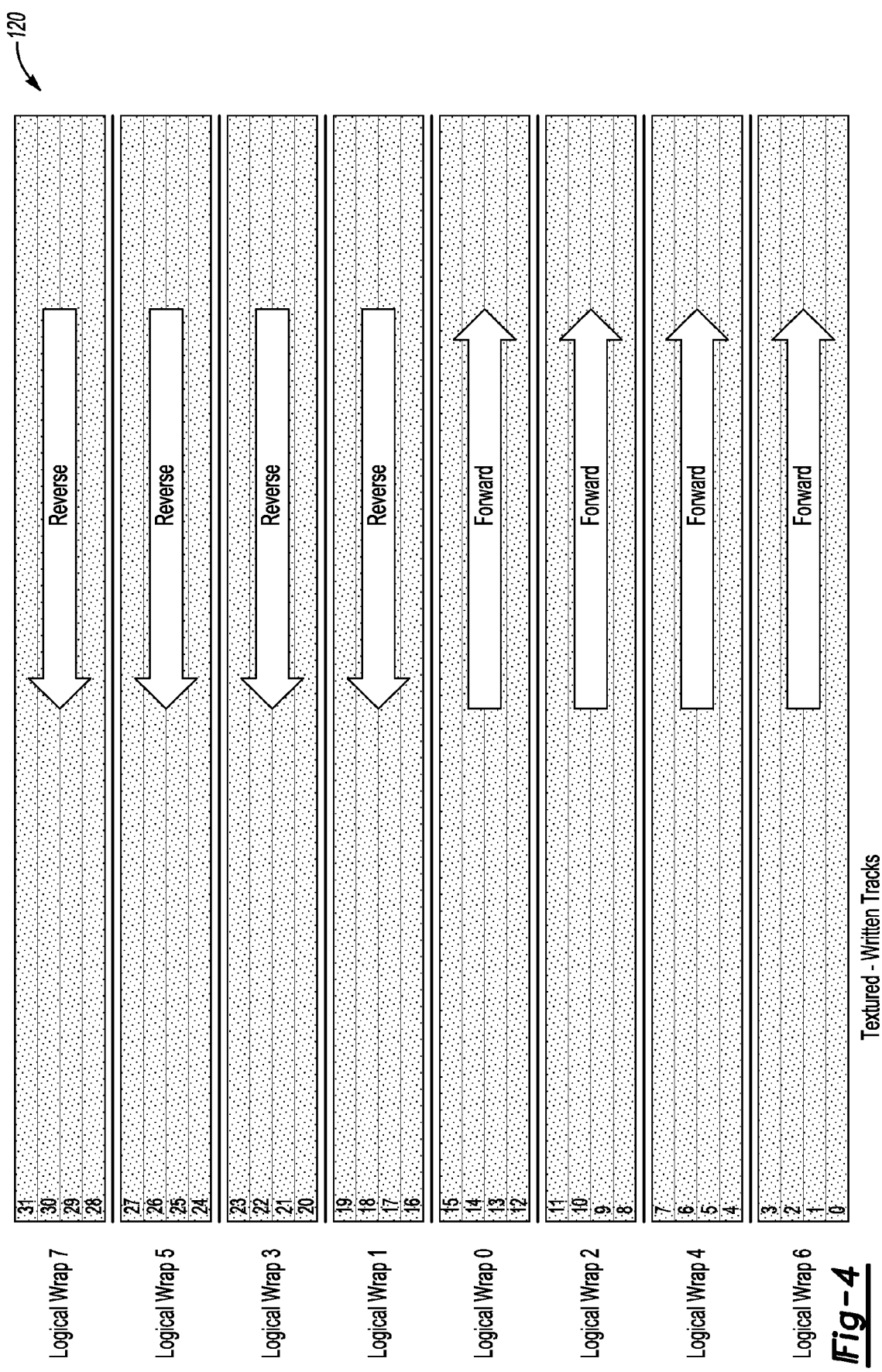
FIG. 4 is a schematic diagram of an optical tape written with 8 wraps, each wrap having 4 physical tracks.

Referring to FIGS. 1 and 4, an optical tape 120 may include 32 physical tracks (track 0-track 31). Other tapes may of course have a different number of physical tracks. Assuming that the data rate of each of the optical pickup units 112$n$ is 40 MB/s and the desired data transfer rate in this example is 160 MB/s, 4 of the optical pickup units 112$n$ will be inactive, 4 of the optical pickup units 112$n$ will be active, and each of the logical wraps will have 4 physical tracks. That is in this example, the number of physical tracks in each wrap is defined by the number of active optical pickup units 112$n$.

To write logical wrap 0, the controller 114 positions, at beginning of tape, the optical pickup unit 112$a$ over track 15, optical pickup unit 112$b$ over track 14, optical pickup unit 112$c$ over track 13, and optical pickup unit 112$d$ over track 12 (assuming the optical pickup units 112$a$-112$d$ are active and the optical pickup units 112$e$-112$h$ are inactive). The tape 120 is then moved in the forward direction to write data to tracks 12 through 15 via the optical pickup units 12$a$-12$d$ until end of tape is reached. To write logical wrap 1, the controller 114 positions, at the end of tape, the optical pickup unit 112$a$ over track 19, optical pickup unit 112$b$ over track 18, optical pickup unit 112$c$ over track 17, and optical pickup unit 112$d$ over track 16. The tape 120 is then moved in the reverse direction to write data to tracks 16 through 19 via the optical pickup units 112$a$-112$d$ until the beginning of tape is reached. To write logical wrap 2, the controller 114 positions, at the beginning of tape, the optical pickup unit 112$a$ over track 11, optical pickup unit 112$b$ over track 10, optical pickup unit 112$c$ over track 9, and optical pickup unit 112$d$ over track 8. The tape 120 is then moved in the forward direction to write data to tracks 8 through 11 via the optical pickup units 112$a$-112$d$ until the end of tape is reached. To write logical wrap 3, the controller 114 positions, at the end of tape, the optical pickup unit 112$a$ over track 23, optical pickup unit 112$b$ over track 22, optical pickup unit 112$c$ over track 21, and optical pickup unit 112$d$ over track 20. The tape 120 is then moved in the reverse direction to write data to tracks 23 through 20 via the optical pickup units 112$a$-112$d$ until the beginning of tape is reached.

To write logical wrap 4, the controller 114 positions, at the beginning of tape, the optical pickup unit 112$a$ over track 7, optical pickup unit 112$b$ over track 6, optical pickup unit 112$c$ over track 5, and optical pickup unit 112$d$ over track 4. The tape 120 is then moved in the forward direction to write data to tracks 4 through 7 via the optical pickup units 112$a$-112$d$ until the end of tape is reached. To write logical wrap 5, the controller 114 positions, at the end of tape, the optical pickup unit 112$a$ over track 27, optical pickup unit 112$b$ over track 26, optical pickup unit 112$c$ over track 25, and optical pickup unit 112$d$ over track 24. The tape 120 is then moved in the reverse direction to write data to tracks 24 through 27 via the optical pickup units 112$a$-112$d$ until the beginning of tape is reached. To write logical wrap 6, the controller 114 positions, at the beginning of tape, the optical pickup unit 112$a$ over track 3, optical pickup unit 112$b$ over track 2, optical pickup unit 112$c$ over track 1, and optical pickup unit 112$d$ over track 0. The tape 120 is then moved in the forward direction to write data to tracks 0 through 3 via the optical pickup units 112$a$-112$d$ until the end of tape is reached. Finally to write logical wrap 7, the controller 114 positions, at the end of tape, the optical pickup unit 112$a$ over track 31, optical pickup unit 112$b$ over track 30, optical pickup unit 112$c$ over track 29, and optical pickup unit 112$d$ over track 28. The tape 120 is then moved in the reverse direction to write data to tracks 31 through 28 via the optical pickup units 112$a$-112$d$ until the beginning of tape is reached. This example tape format is designed such that at the completion of a full tape write, the tape is positioned at the beginning of tape to facilitate ease of unloading.

Table 1 maps the logical wraps of FIG. 4 to the physical tracks of FIG. 4:

TABLE 1

Logical Wrap to Physical Track Range

| Logical Wrap | 0 | 1 | 2 | 3 | 4 | 5 | 6 | 7 |
|---|---|---|---|---|---|---|---|---|
| Physical Track Range | 12-15 | 16-19 | 8-11 | 20-23 | 4-7 | 24-27 | 0-3 | 28-31 |

In other examples, the logical wraps may have different physical locations. Tables 2 and 3 alternatively map logical wraps to physical tracks:

TABLE 2

Alternative Logical Wrap to Physical Track Range

| Logical Wrap | 0 | 1 | 2 | 3 | 4 | 5 | 6 | 7 |
|---|---|---|---|---|---|---|---|---|
| Physical Track Range | 0-3 | 4-7 | 8-11 | 12-15 | 16-19 | 20-23 | 24-27 | 28-31 |

TABLE 3

Alternative Logical Wrap to Physical Track Range

| Logical Wrap | 0 | 1 | 2 | 3 | 4 | 5 | 6 | 7 |
|---|---|---|---|---|---|---|---|---|
| Physical Track Range | 16-19 | 12-15 | 20-23 | 8-11 | 24-27 | 4-7 | 28-31 | 0-3 |

Other arrangements are also possible.

The optical tape drive system 110 may include a user interface (not shown) to facilitate selection of a desired data transfer rate. A field of a display screen, for example, may list several available data transfer rates (dictated by the number of optical pickup units and their associated data rate). A user may thus input their desired data transfer rate and the controller 114, in response, may configure and operate the optical pickup units 112$n$ as described herein to achieve the selected data transfer rate.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An optical tape drive system comprising:
   n total optical pickup units each having a same fixed unit data rate and calibrated to operate at a particular optical tape speed; and
   a controller configured to write, at the particular optical tape speed, readable data in logical wraps to the optical tape via at least some of the optical pickup units at a selected one of several available system data rates each of which is less than the product of n and the fixed unit data rate such that for each of the logical wraps that contain readable data, all physical tracks within the logical wrap contain readable data.

2. The system of claim 1 wherein the controller is further configured to render inactive a number of the optical pickup units equal to the complement of the quotient of the selected system data rate and fixed unit data rate to achieve the selected system data rate.

3. The system of claim 2 wherein the controller is further configured to render inactive adjacent optical pickup units.

4. The system of claim 2 wherein the controller is further configured to render inactive adjacent optical pickup units such that all active optical pickup units are adjacent to one another.

5. The system of claim 4 wherein the number of physical tracks within each of the logical wraps is equal to the number of active optical pickup units.

6. The system of claim 1 wherein the controller is further configured to render inactive a different number of the optical pickup units to achieve each of the available system data rates.

7. An optical tape drive system comprising:
   n total optical pickup units; and
   a controller configured to write readable data in logical wraps each having less than n physical tracks to the optical tape via at least some of the optical pickup units such that for each of the logical wraps that contain readable data, all physical tracks within the logical wrap contain readable data.

8. The system of claim 7 wherein each of the optical pickup units has a same fixed unit data rate and wherein the controller is further configured to write readable data at a selected system data rate less than the product of n and the fixed unit data rate.

9. The system of claim 8 wherein the number of physical tracks within each of the logical wraps is based on the selected system data rate.

10. The system of claim 8 wherein the number of physical tracks within each of the logical wraps is based on the fixed unit data rate.

11. The system of claim 8 wherein the controller is further configured to render inactive a number of the optical pickup units equal to the complement of the quotient of the selected system data rate and fixed unit data rate to achieve the selected system data rate.

12. The system of claim 11 wherein the controller is further configured to render inactive adjacent optical pickup units.

13. The system of claim 11 wherein the controller is further configured to render inactive adjacent optical pickup units such that all active optical pickup units are adjacent to one another.

14. The system of claim 13 wherein the number of physical tracks within each of the logical wraps is equal to the number of active optical pickup units.

15. A method for writing data to optical tape with an optical tape drive system having n total optical pickup units each having a same fixed unit data rate, the method comprising:
    receiving a selected system data rate less than the product of n and the fixed unit data rate;
    rendering inactive a number of the optical pickup units based on the selected system data rate and the fixed unit data rate; and
    writing readable data at the selected system data rate in logical wraps to the optical tape via the optical pickup units that are active such that the number of physical tracks within each of the logical wraps is equal to the number of optical pickup units that are active.

16. The method of claim 15 wherein the number of the optical pickup units is rendered inactive such that the optical pickup units that are active are adjacent to one another.

17. The method of claim 15 wherein for each of the logical wraps that contain readable data, all physical tracks within the logical wrap contain readable data.

18. The method of claim 15 wherein the number of the optical pickup units that are active is equal to the quotient of the selected system data rate and the fixed unit data rate.

* * * * *